May 2, 1933.  F. REGERO  1,907,366
WATCH CLEANING MACHINE
Filed Dec. 13, 1930  2 Sheets-Sheet 1
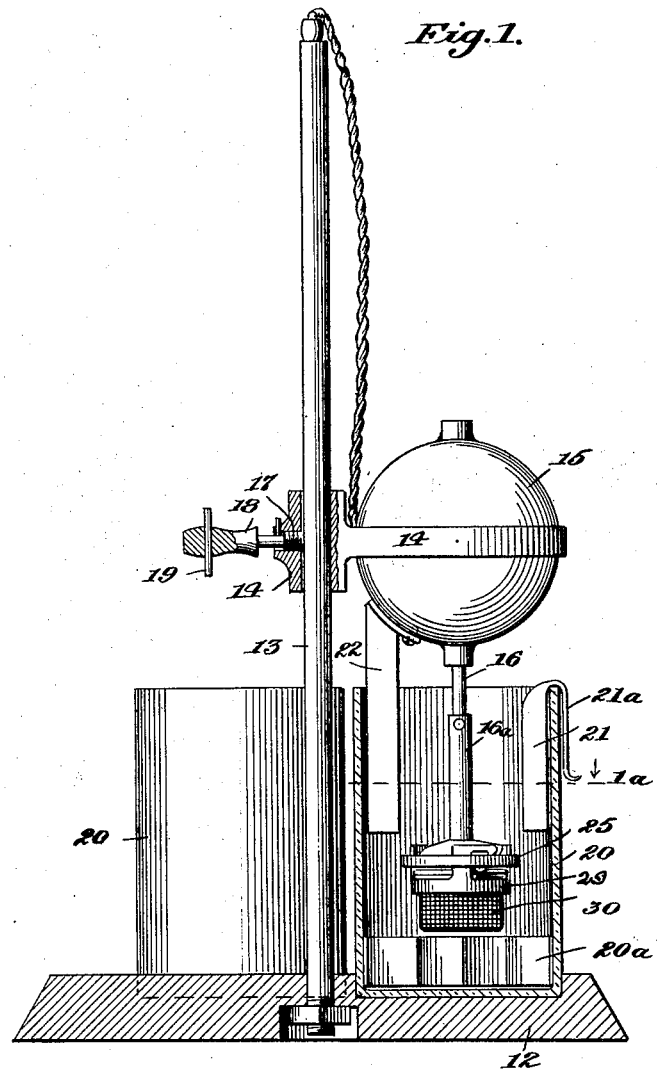
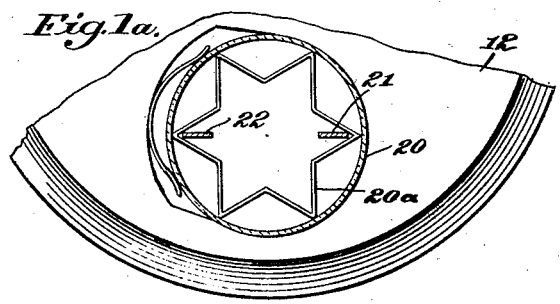
Inventor:
Frank Regero, May 2, 1933.  F. REGERO  1,907,366
WATCH CLEANING MACHINE
Filed Dec. 13, 1930   2 Sheets-Sheet 2
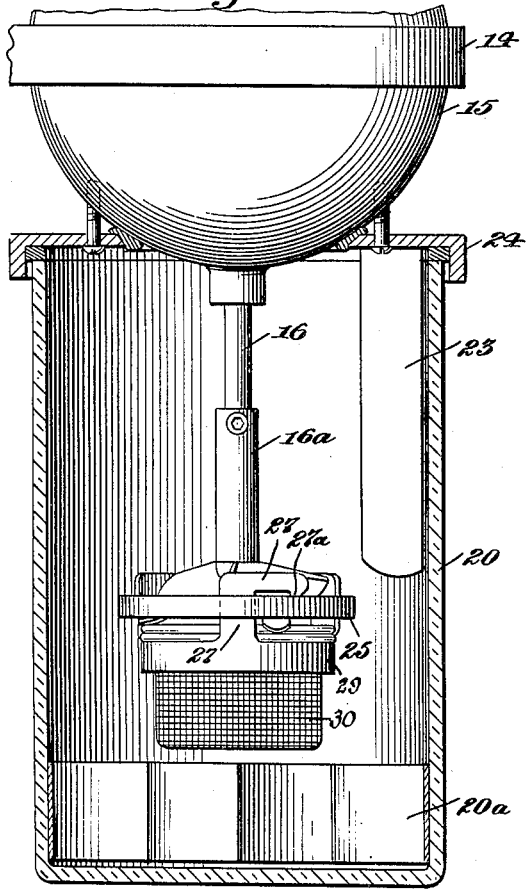
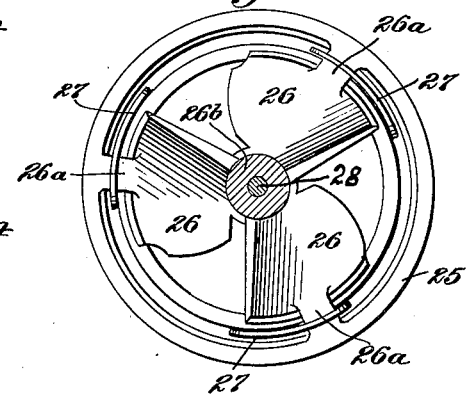
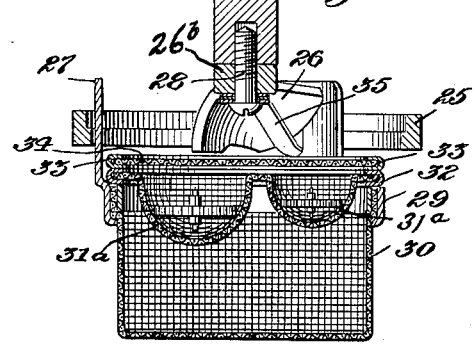
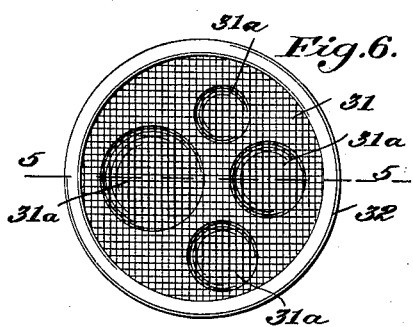
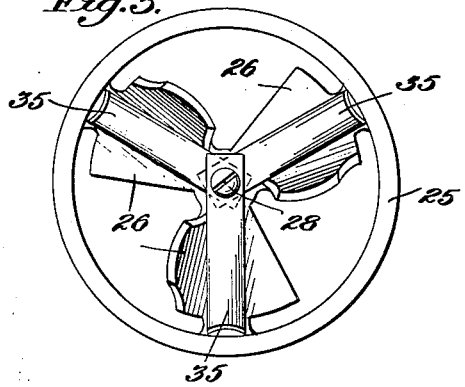
Inventor:
Frank Regero,
by Calvin Calvin
Att'ys.

Patented May 2, 1933

1,907,366

UNITED STATES PATENT OFFICE

FRANK REGERO, OF MACON, GEORGIA, ASSIGNOR TO L. & R. MANUFACTURING COMPANY, A CORPORATION OF NEW JERSEY

WATCH CLEANING MACHINE

Application filed December 13, 1930. Serial No. 502,230.

This invention relates to certain improvements on the watch cleaning machines shown and described in Patent No. 1,817,266, dated August 4, 1931, and my Patent No. 1,872,812, dated August 23, 1932; a leading feature of the present improvement comprising baffles or solution throwers by which solution liquid which has splashed upward will be thrown back onto the rotating receptacle or basket containing the parts to be cleansed. Other improvements relate to means for supporting the cleaning apparatus on the supporting standard and to certain detail improvements in the parts-containing receptacle or basket and its carrier and the connection of said receptacle or basket with a rotating shaft.

In the accompanying drawings Fig. 1 is a sectional elevation of a watch cleaning machine embodying one form of the present invention. Fig. 1$^a$ is a fragmentary sectional view on line 1$^a$, Fig. 1. Fig. 2 illustrates a slightly different form of the invention from that shown in Fig. 1. Figs. 3 and 4 are bottom and top views, respectively, of the receptacle carrier. Fig. 5 is a vertical section of the basket or receptacle carrier and the parts-containing receptacles or baskets, the section of the auxiliary receptacle or basket being on line 5—5, Fig. 6. Fig. 6 is a plan view of the auxiliary basket or parts-containing receptacle.

Referring to the drawings, 12 denotes a base to which is affixed a standard 13 to which is adjustably and movably attached a bracket 14 which sustains an electric motor, the casing of which is denoted by 15, said motor having a depending shaft 16. The hub portion of the bracket 14 is tapped for the reception of a set screw 17 having a handle 18 preferably provided with a cross pin 19 to assist in turning said set screw. The base 12 is adapted to support a plurality of jars 20 for holding cleaning solutions of different kinds, and by loosening the said set screw 17 the said bracket 14 may be turned on the standard 13 so as to bring the parts-containing receptacle connected with the lower end of the motor shaft 16 into vertical register with any one of said jars into which the said receptacle can be lowered for a cleaning operation.

In the bottom of each of the jars 20 a solution breaker 20$^a$ will preferably be placed.

To increase the efficiency of the machine when in operation solution throwers or baffles are provided. These baffles may be supported above the baskets, containing the parts to be cleansed, in various ways, and will serve to throw liquid which may be splashed upward back onto the receptacles containing the parts to be cleansed. To this end each of the solution throwers may consist of a plate 21 having a hook or depending part 21$^a$ which may be hooked onto a solution jar 20, as shown in Fig. 1; or a solution thrower may consist of a plate 22 attached to the casing of the motor 15, as also shown in Fig. 1. Or the solution thrower or baffle may consist of one or more plates 23 attached to and depending from a jar cover 24 attached to the motor casing 15. As the baffles or solution throwers 22 and 23 are attached to or connected with the motor casing these baffles or solution throwers will be raised or lowered with the motor and the parts-containing receptacles connected therewith. Of course two or more forms of these baffles or solution throwers may be used together, as shown in Fig. 1.

It will be noted that all these different forms of the baffles or solution throwers are suspended from above and extend down into the solution-holding jars 20 and may be mainly or wholly above the level of the solution liquids in said jars so as to cause the return of any upwardly-splashed liquid to the body of the liquid below, or onto the parts-holding receptacle if the latter be not too deeply immersed in the cleaning solution. In other words the radially disposed baffles or solution throwers are in the upper parts of the solution-holding jars, as they must necessarily be to perform the function of causing the splashed liquid to be returned, as above stated.

The watch parts-containing receptacle is connected with the lower end of a shaft 16$^a$ which may be an extension of the motor shaft 16, by a construction similar to that shown and described in my Patent No. 1,872,812. In the present instance the basket carrier comprises a ring 25 connected by radial vane arms 26 with a hub 26$^b$ attached by a set screw 28 to the lower end of the shaft 16$^a$. It will be noted that these vane arms are curved so as to act as propellers to force the cleaning solution liquids downward through the parts-containing baskets. The outer ends of these vane arms are cut away to form reduced portions 26$^a$ to be engaged by holding brackets 27 integral with and extending upward from a rim 29 of the main wire mesh basket 30. Each of these brackets 27 is provided with a downwardly extending lug 27$^a$, the space between said lug and the vertical portion of each bracket being adapted to receive a reduced part 26$^a$ of the vane arm 26. In other words, the horizontal parts of the brackets 27 are formed as hooks which will prevent any relative rotary movement of the receptacle or basket and the basket holder when these parts are locked together.

Resting on the rim 29 of the said basket 30 is a wire mesh auxiliary basket member 31 provided with a series of depressions or pockets 31$^a$, of different sizes, for holding small parts. These pockets are so shaped, being circular and concave, as to protect the pivots of watch balance wheels placed therein for cleaning, as will be understood from Fig. 5. The wire mesh basket member 31 is encircled by a rim 32 resting on the said rim 29 of the main basket 30; said wire mesh member 31, with its pockets, forming the auxiliary receptacle or basket. Resting on the rim 32 of the auxiliary member 31 is a cover member comprising a sheet metal rim 33 and a wire mesh body part 34.

Attached to the lower end of the motor shaft, by the set screw 28, are spring arms or springs 35 pressing on the rim 33 of the cover member. To connect the parts-receiving members and the cover with the basket holder an upward pressure on the rim 29 of the main basket will compress the spring arms or springs 35 so that the hooks 27$^a$ on the brackets 27 will be lifted above the level of the reduced portions 26$^a$ of the radial arms 26; and the said main basket, together with the auxiliary basket and cover, may then be partly rotated to bring the horizontal recesses of the brackets, afforded by the lugs 27$^a$, into register with the parts 26$^a$ of the vane arms. The upward pressure may then be relaxed and the spring arms or springs 35, pressing downward on the rim 33 of the cover, will force the parts-receptacle downward and will thus lock the said parts-receptacle or basket to the basket carrier. This positive locking feature is an improvement on the construction shown in my application No. 457,374, and prevents any accidental displacement of the parts-receiving receptacle or basket from its holder when the machine is in operation.

It will thus be understood that the present invention provides an efficient watch cleaning machine which can be conveniently operated to effect a rapid cleansing of the watch parts.

Having thus described my invention, I claim and desire to secure by Letters Patent:

1. In a watch cleaning machine, the combination with a parts-holding receptacle and means for rotating the same, said rotating means comprising a holder having radial vane arms, of means for positively locking said receptacle to said holder, said locking means comprising hooked brackets connected with said receptacle, and springs on said holder for forcing said receptacle downward to engage said hooked brackets with parts of said arms.

2. In a watch cleaning machine, the combination with a parts-containing receptacle and vertically adjustable means for holding the same, of a stationary jar for holding a cleaning solution, baffles arranged to extend downward from above into the upper part of said jar, and vertically adjustable means for rotating said receptacle when dipped into said jar, one at least of said baffles being connected with said means for rotating said receptacle so as to be adjustable vertically therewith.

3. In a watch cleaning machine, a rotatable parts-containing receptacle comprising main and auxiliary baskets, said auxiliary basket having circular concave pockets in which certain watch parts may properly rest.

4. In a watch cleaning machine, a rotatable watch-cleaning receptacle adapted to be immersed in a cleaning liquid and comprising main and auxiliary baskets, said auxiliary basket having circular concave pockets in which certain watch parts may fit, and rotating means above said baskets for supporting the same, said supporting means comprising rotatable vane arms above said baskets to serve as a propeller to force the cleaning fluid through said baskets.

5. In a watch cleaning machine, the combination with a parts-containing receptacle and vertically adjustable means for holding the same, of a jar for holding a cleaning solution, baffles arranged to extend from above into the upper part of said jar, and vertically adjustable means for rotating said receptacle when dipped into said jar, one at least of said baffles being connected with said driving means so as to be adjustable vertically therewith, and one at least of said baffles being supported by said jar.

In testimony whereof I affix my signature.

FRANK REGERO.